United States Patent [19]

Michio

[11] 4,121,799
[45] Oct. 24, 1978

[54] TRIPOD FOR A CAMERA

[76] Inventor: Kawazoe Michio, 30-11 5 chome, Narita Higashi Suginami-ku, Tokyo, Japan

[21] Appl. No.: 824,354

[22] Filed: Aug. 15, 1977

[30] Foreign Application Priority Data

Dec. 30, 1976 [JP] Japan .......................... 52-176061[U]
Apr. 12, 1977 [JP] Japan .......................... 52-045988[U]

[51] Int. Cl.$^2$ .......................................... F16M 11/38
[52] U.S. Cl. ................... 248/171; 248/188.7; 248/188.5
[58] Field of Search ............... 248/168, 169, 170, 171, 248/188.5, 188.7, 435; 74/532; 292/153; 24/211 M

[56] References Cited

U.S. PATENT DOCUMENTS

| 721,425 | 2/1903 | Clyde | 248/170 |
| 2,710,239 | 6/1955 | Lobendank | 248/188.5 |
| 3,632,073 | 1/1972 | Nakatani | 248/169 |

FOREIGN PATENT DOCUMENTS

| 2,502,520 | 7/1975 | Fed. Rep. of Germany | 248/171 |
| 62,566 | 4/1940 | Norway | 248/169 |

*Primary Examiner*—Robert A. Hafer
*Attorney, Agent, or Firm*—Donald D. Mon

[57] ABSTRACT

A tripod for a camera comprises a casing with a mounting part of a camera, and a slider in the casing. The slider is spring-loaded with a depressing spring so as to go down. A lockable member extends above the slider. To three forked parts of the slider, three legs are respectively hinged and spring-loaded with springs for opening the legs. A locking member is hinged to a frame which is fixed in the casing. A push rod shaped legs-opening control element is provided for shifting the lockable member. When the legs are put in the casing, the locked member engages the locking member so that the slider with the legs are held to the casing. When the legs-opening control element is pushed towards the lockable member, the locking member is shifted and the locked member is released from the locking so that the slider is pushed out by the depressing spring, and then the legs are opened.

11 Claims, 5 Drawing Figures

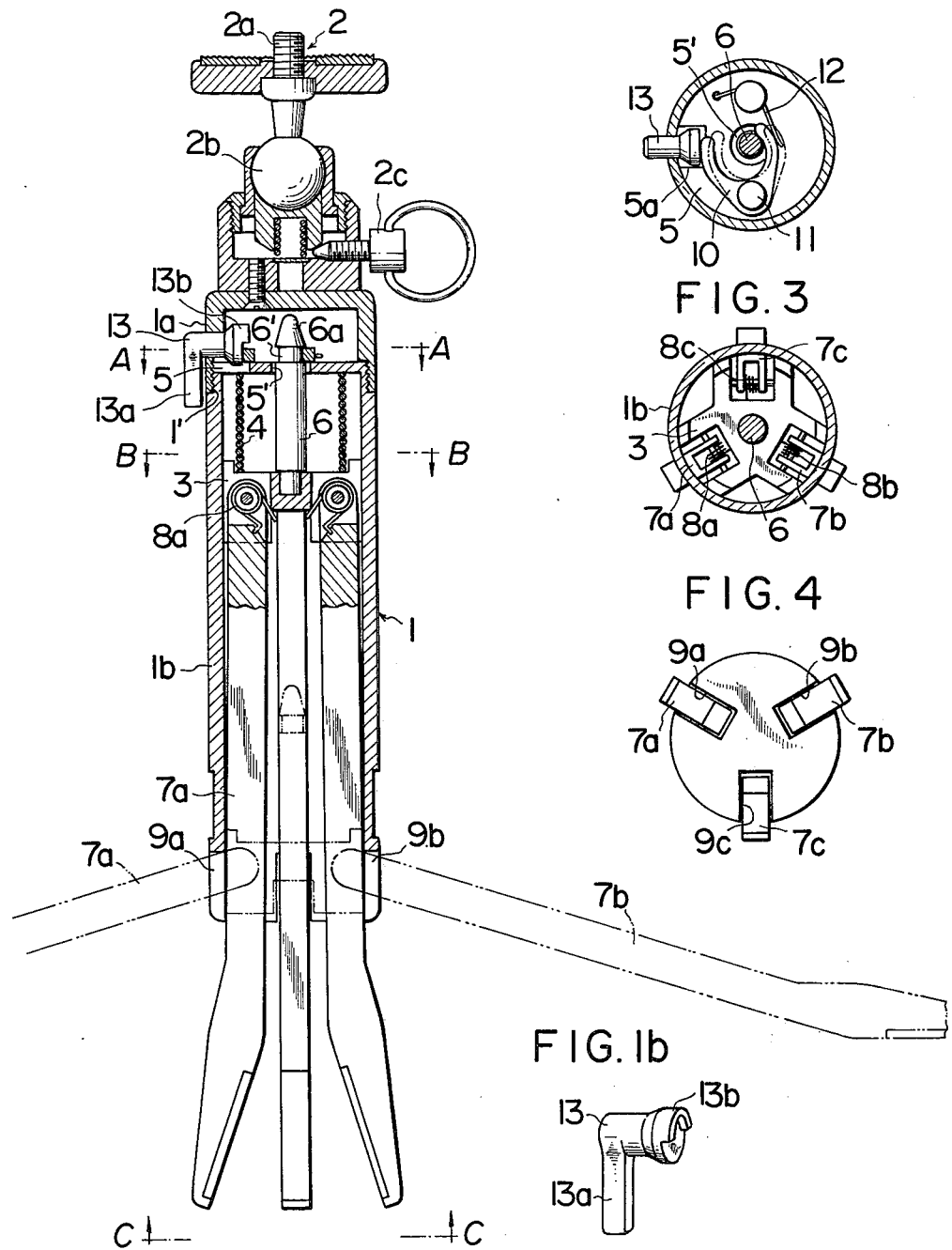

TRIPOD FOR A CAMERA

BACKGROUND OF THE INVENTION

This invention relates to a tripod for a camera, and more particularly concerns a self-opening tripod in which its legs can be automatically pushed out of a casing, opened, and operated with push button control, and the legs can be held within the casing only by being closed together and thrust into the casing.

A conventional tripod for a camera is a three-legged support, usually adjustable for height. When setting a conventional tripod, at first, length-adjustable legs are first extended to an appropriate length, and then these legs are opened to an appropriate inclined angle and, thereafter the conventional tripod is put on the floor. Therefore, its operation is not easy and cannot be done quickly.

Furthermore a conventional tripod is not suitable for locating a camera at an appropriate level above a table.

BRIEF SUMMARY OF THE INVENTION

It is an object of the invention to provide a tripod for a camera which can be set up easily and quickly.

It is another object of the invention to provide a tripod for a camera which is suitable for locating a camera above a table.

It is another object of the invention to provide a tripod for a camera whose has safety device for preventing the legs from undesirably expanding.

These and other objects of the invention will become more apparent in the detailed description and example which follow.

BRIEF DESCRIPTION OF THE DRAWING

In the drawing:

FIG. 1(a) is an elevational view partly in section of an embodiment of a tripod for a camera according to the invention;

FIG. 1(b) is a perspective view of a leg control device;

FIG. 2 is a cross section at A — A line in FIG. 1;

FIG. 3 is a cross section at B — B line in FIG. 1; and

FIG. 4 is a cross section at C — C line in FIG. 1.

Referring more particularly to the drawing, numeral 1 designates a cylindrical casing which comprises an upper section 1a and an under section 1b, the two being joined with each other by means of screw 1'. The upper section 1a has a member on which a camera can be mounted and the under section 1b is longer than the upper section 1a, which houses legs described hereinafter. The member 2 for mounting a camera comprises a screw for 2a which is screwed into a tapped hole of a camera for mounting the camera, a ball joint 2b by which the direction of the camera can be optionally shifted, and a screw 2c for holding a set direction of the camera. Numeral 3 designates a Y-shaped slider which is slidably provided within the under section 1b. Numeral 4 designates a spring for pushing out the Y-shaped slider, which is interposed between the slider 3 and a fixed frame 5 in the upper section 1a. Numeral 6 designates a rod-shaped lockable member, which extends above the slider 3 and a tip of the locked member 6 has the shape of a cone 6a, and under the cone-shaped part, an annular concave part is made. Numerals 7a to 7c designate legs which are respectively hinged to three-forked parts of the slider 3, the legs being respectively spring-loaded with springs for opening legs 8a to 8c, so as to open when the legs are pushed out from within the casing 1. Numerals 9a to 9c designate three openings which are made in the under part of the under section 1b, for holding the legs 7a to 7c when being opened. Numeral 10 designates a U-shaped locking member which is hinged to the frame through a pin 11, and which faces a through-hole 5' made at the center of the frame. When the legs 7a to 7c are closed and thrust into the under section 1b against the spring 4', an annular concave part 6' of the top part of the locked member 6 will pass the through-hole 5', and engage the U-shaped locking member by a spring 12 which pushes the locking member against the locked member, whereby the legs 7a to 7c are held within the under section 1b. Numeral 13 designates a leg-opening control element comprising a push rod one end of which is in contact with the locking member 10 and the other end projecting from within the upper section 1a. By pushing the leg-opening control element, the locking element 10 is shifted against the force of the spring 12, so that the locking member 10 will be released from the annular concave part 6' of the top part of the locked member 6.

Further, desirably the leg-opening control element 13 is rotatably inserted into a round hole in the upper portion 1a, and the push rod has a turning arm 13a, at its outer end, which protrudes from the outer end of the push rod at a right angle to the axis shaftline of the push rod. An inner part of the push rod is made thicker than an outer part of that and under the inner part of the push rod, U-shaped notch 5a of the frame 5 is made, and the lower part of the inner part of the push rod is situated in the U-shaped notch 5a as shown in FIG. 1.

As a tripod for a camera according this invention is constructed as stated above, when the leg-opening control element is pushed, the locking member 10 will be transferred from one position which is shown by the full line in FIG. 2 to another position which is shown by the dotted line in FIG. 2 against the spring 12, and the locking member 10 will be released from the annular concave part 6' of the top part of the locked member 6. As a result, the slider 3 will be pushed out by the spring 4, and then the legs 7a to 7c hinged to a three-forked part of the slider 3 will be opened by the springs 8a to 8c and held by the openings 9a to 9c as shown by the dotted line in FIG. 1. On the other hand, in the case of putting the legs 7a to 7c in the casings 1, the legs 7a to 7c are closed against the spring 8a to 8c, then the slider is thrusted in the under section 1b against the spring 4, so that the top part of the locked member 6 which extends above the slider 3 passes the through-hole 5' of the frame 5. And the locking member 10 is moved by the tip of the locked member 6 against the spring 12, engaging the annular concave part 6' of the top part of the locked member 6. Consequently, the legs 7a to 7c will be held within the under section 1b to the casing 1.

Under this condition, when the leg-opening control element 13 is turned with the arm 13b at an angle of 180°, the semi-annular convex part 13b faces the inner edge of the notch 5a, and the semi-annular convex part is hindered from moving inwards by the inner edge of the notch 5. Therefore, as the semi-annular convex part hinders the leg-opening control element 13 from coming in contact with the locking member, the legs 7a to 7c will be prevented from pushing out unexpectedly.

As stated above, in the tripod for a camera according this invention an operater can, with pushing the leg-opening control element, automatically, push out the legs from within the casing and open that. Therefore, its operation is simple. Further it is safe as the legs are hindered from pushing out unexpectedly.

As many apparently widely different embodiment of this invention may be without departing from the spirit and scope thereof, it is to be understood that the invention is not limited to the specific embodiments thereof excepts as defined in the appended claim.

What is claimed is:

1. A tripod for a camera comprising;
   a casing which is provided with a mounting part of a camera,
   a slider which is slidably provided within the casing,
   a depressing spring which is interposed between the slider and a fixed frame in an upper section of the casing,
   a locked member which extends above the slider,
   legs which are respectively hinged to three forked parts of the slider, and which are respectively spring-loaded with springs for opening the legs,
   a locking member being hinged to the frame through a pin, which engages the locked member when the legs are thrusted into the casing against the depressing spring, and
   a leg-opening control element including a push rod which has one end coming in contact with the locking member, and another end projecting from within the upper section of the casing.

2. A tripod for a camera as claimed in claim 1, wherein the locked member is rod-shaped and a tip of the locked member has the shape of a cone, and the locked member has an annular concave part, and the locking member is U-shaped and faces a through-hole made at the center of the frame.

3. A tripod for a camera as claimed in claim 1, wherein an opening for holding the legs are made in the under part of the casing.

4. A tripod for a camera comprising a casing which is provided with a mounting part of a camera,
   a slider which is slidably provided within the casing,
   a depressing spring which is interposed between the slider and a fixed frame in an upper section of the casing,
   a locked member which extends above the slider,
   legs which are respectively hinged to three forked parts of the slider, and which are respectively spring-loaded with springs for opening the legs,
   a locking member being hinged to the frame through a pin, which engages the locked member when the legs are thrusted into the casing against the depressing spring,
   a leg-opening control element including a push rod which has one end coming in contact with the locking member, and another end projecting from within the upper section of the casing, and
   a means for hindering the leg-opening control element from acting on the locking member.

5. A tripod for a camera as claimed in claim 4, wherein the locked member is rod-shaped and a tip of the locked member has the shape of a cone, and the locked member has an annular concave part, and the locking member is U-shaped and faces a through-hole made at the center of the frame.

6. A tripod for a camera as claimed in claim 4, wherein an opening for holding the legs are made in the under part of the casing.

7. A tripod for a camera as claimed in claim 4, wherein the leg-opening control element is rotatably inserted into a round hole in the upper section, and the push rod has an turning arm, at its outer end, which protrudes from the outer end of the push rod at a right angle to the axis shaftline of the push rod, and an inner part of the push rod is made thicker than an outer part of that, and under the inner part of the push rod U-shaped notch of the frame is made, and the lower part of the inner part of the push rod is situated in the U-shaped notch, and the push rod is provided with a semi-annular convex part which engages an inner edge of the notch.

8. A tripod for a camera comprising:
   a casing having a vertical axis and which is provided with means for mounting a camera,
   a slider which is slidable vertically within the casing,
   a depressing spring interposed between the slider and a fixed frame in an upper section of the casing,
   a lockable member which extends above the slider within the casing,
   legs which are respectively hinged to three forked parts of the slider, and which are respectively spring-loaded with springs for opening the legs,
   a locking member hinged to the frame through a pin, adapted to engage the lockable member and move it to a position which locks the locked member when the legs are thrust into the casing against the depressing spring,
   means urging said locking member to swing on the pin to the position which locks the locking member,
   a leg-opening control element including a push rod having a horizontal axis and movable on said last-mentioned axis, said push rod having an internal end adapted to come in contact with the locking member, and an external end projecting outwardly from the casing from within the upper section of the casing, whereby when the push rod is pushed inwardly along its axis toward said vertical axis the locking means swings to a position which unlocks the lockable member, causing the legs to move downwardly and spread outwardly from the casing.

9. A tripod for a camera as claimed in claim 8, wherein the lockable member is rod-shaped and a tip of the lockable member has the shape of a cone, and the locked member has an annular concave part, and the locking member is U-shaped and faces a through-hole at the center of the frame through which the lockable member passes.

10. A tripod for a camera as claimed in claim 8, wherein there is an opening for holding the legs in the under part of the casing.

11. A tripod according to claim 8 in which the push rod is rotatable and its internal end contains an inwardly protruding portion at an angular position thereof and also a stop means at said angular position so that it cannot unlock the lockable member when it is rotated through an angle from an angular position at which it can be pushed inwardly to unlock the lockable member.

* * * * *